United States Patent
Zhang et al.

(10) Patent No.: US 11,755,163 B2
(45) Date of Patent: Sep. 12, 2023

(54) TOUCH PANEL AND ELECTRONIC DEVICE

(71) Applicants: Chengdu BOE Optoelectronics Technology Co., Ltd., Sichuan (CN); BOE Technology Group Co., Ltd., Beijing (CN)

(72) Inventors: Shun Zhang, Beijing (CN); Yuanqi Zhang, Beijing (CN); Yi Zhang, Beijing (CN); Chang Luo, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/683,714

(22) Filed: Mar. 1, 2022

(65) Prior Publication Data

US 2022/0300116 A1  Sep. 22, 2022

(30) Foreign Application Priority Data

Mar. 19, 2021 (CN) .......................... 202110296858.7

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01)

(58) Field of Classification Search
CPC ..................................... G06F 3/0443
See application file for complete search history.

(56) References Cited

U.S. PATENT DOCUMENTS

| 2016/0202826 | A1* | 7/2016 | Han | G06F 3/0412 |
| | | | | 345/174 |
| 2018/0107330 | A1* | 4/2018 | Meng | G06F 3/0443 |
| 2019/0294282 | A1* | 9/2019 | Dun | G06F 3/0416 |
| 2020/0401274 | A1* | 12/2020 | Moon | G06F 3/045 |
| 2021/0141258 | A1* | 5/2021 | Maeda | G02F 1/13629 |

FOREIGN PATENT DOCUMENTS

CN          208367661 U      1/2019

* cited by examiner

*Primary Examiner* — Robin J Mishler
(74) *Attorney, Agent, or Firm* — IPRO, PLLC

(57) ABSTRACT

Provided is a touch panel. The touch panel includes a back plate and a touch electrode layer disposed on a side of the back plate, wherein the touch electrode layer has a circular touch region and includes a plurality of touch electrodes, the plurality of touch electrodes are distributed in the touch region, and any touch electrode distal from a periphery of the touch region has three side edges sequentially connected end to end.

19 Claims, 12 Drawing Sheets

TOUCH PANEL AND ELECTRONIC DEVICE

CROSS-REFERENCE TO RELATED APPLICATION

This application claims priority to Chinese patent application No. 202110296858.7, filed on Mar. 19, 2021 and entitled "TOUCH PANEL AND ELECTRONIC DEVICE", the entire content of which is incorporated herein by reference.

TECHNICAL FIELD

The present disclosure relates to the field of display technologies, and in particular relates to a touch panel and an electronic device.

BACKGROUND

In a touch panel with a circular touch region, touch electrodes in the middle of the touch region are generally square electrodes. In this design, the sizes of the touch electrodes arranged at the edge are quite different from the sizes of the touch electrodes arranged in the middle.

SUMMARY

According to an aspect of the present disclosure, a touch panel is provided. The touch panel includes a back plate and a touch electrode layer disposed on a side of the back plate, wherein the touch electrode layer has a circular touch region and includes a plurality of touch electrodes, wherein the plurality of touch electrodes are distributed in the touch region, and any touch electrode distal from a periphery of the touch region has three side edges sequentially connected end to end.

Optionally, the plurality of touch electrodes are divided into a plurality of touch electrode groups, wherein the plurality of touch electrode groups are sequentially distributed around a center point of the touch region, and adjacent touch electrode groups of the plurality of touch electrode groups are in rotationally symmetric distribution around the center point.

Optionally, the touch electrodes in the touch electrode group are in a fan-shaped distribution.

Optionally, the plurality of touch electrodes are divided into six touch electrode groups with a rotation angle of 60°.

Optionally, in three angles formed by the three side edges of the touch electrode proximal to the center point, the angle proximal to the center point is 60°.

Optionally, the plurality of touch electrodes are divided into eight touch electrode groups with a rotation angle of 45°.

Optionally, in three angles formed by the three side edges of the touch electrode proximal to the center point, the angle proximal to the center point is 45°.

Optionally, the touch electrode group includes four touch electrodes, wherein one touch electrode is proximal to the center point of the touch region, two touch electrodes are proximal to the periphery of the touch region, and the other touch electrode is surrounded by other three touch electrodes.

Optionally, in the plurality of touch electrodes, an area of the touch electrode with a largest area is 1~1.2 times an area of the touch electrode with a smallest area.

Optionally, the plurality of touch electrodes have a same area.

Optionally, at least one side edge of the touch electrode is a non-linear line.

Optionally, the side edges, proximal to each other, of adjacent touch electrodes are non-linear lines.

Optionally, a width of a gap between adjacent touch electrodes is constant.

Optionally, the non-linear line includes one of a wavy line, an arc line and a broken line.

Optionally, the touch electrode layer further includes a plurality of touch leads connected to the plurality of touch electrodes in one-to-one correspondence.

Optionally, at least part of the plurality of touch leads extend out of the touch region along a gap between adjacent touch electrodes.

Optionally, the touch panel further includes: a touch insulating layer and a touch wiring layer, wherein the touch wiring layer and the touch electrode layer are disposed on two opposite sides of the touch insulating layer, and the touch insulating layer is provided with a plurality of via holes; and the touch wiring layer includes a plurality of touch leads connected to the plurality of touch electrodes through the via holes in one-to-one correspondence.

Optionally, the back plate is a display panel.

According to an aspect of the present disclosure, an electronic device is provided. The electronic device includes a touch panel, and the touch panel includes a back plate and a touch electrode layer disposed on a side of the back plate, the touch electrode layer has a circular touch region and includes a plurality of touch electrodes, the plurality of touch electrodes are distributed in the touch region, and any touch electrode distal from a periphery of the touch region has three side edges sequentially connected end to end.

BRIEF DESCRIPTION OF THE DRAWINGS

The accompanying drawings, which are incorporated in and constitute part of the description, illustrate embodiments consistent with the present disclosure and, together with the description, serve to explain the principles of the present disclosure. Apparently, the accompanying drawings in the following description show merely some embodiments of the present disclosure, and a person of ordinary skill in the art may still derive other drawings from these accompanying drawings without creative efforts.

Figure 1:
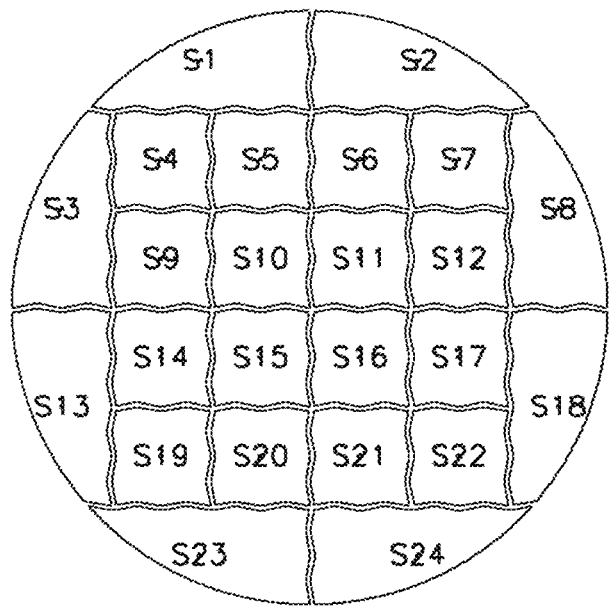
FIG. 1 is a diagram showing structures and distribution of touch electrodes in the related art, in which S1-S24 represent different touch electrodes.

Reference numbers in the drawings and denotations thereof:

101—touch electrode; 102—touch lead; 102a—auxiliary lead; 201—chip bonding pad; 301—touch shielding wire; 302—common electrode; 303—connecting trace; 304—jumper lead; A—touch region; B—peripheral wiring region; B1—bending region; B2—chip bonding region; B3—circuit board bonding region; F100—base substrate; F200—drive circuit layer; F200M—transistor; F201—barrier layer; F202—buffer layer; F203—semiconductor layer; F204—gate insulating layer; F205—gate layer; F206—interlayer dielectric layer; F207—source/drain metal layer; F208—planarization layer; F300—pixel layer; F300D—organic light-emitting diode (OLED); F301—pixel electrode layer; F302—pixel definition layer; F303—support column layer; F304—organic light-emitting functional layer; F305—common electrode layer; F400—thin film encapsulation layer; F401—first inorganic encapsulation layer; F402—organic encapsulation layer; F403—second inorganic encapsulation layer; F501—touch insulating layer; F502—touch electrode layer.

DETAILED DESCRIPTION

Exemplary embodiments are described more fully with reference to the accompanying drawings. However, the exemplary embodiments may be implemented in various ways and shall not be construed as limited to the embodiments set forth herein. Instead, these embodiments are provided to make the present disclosure full and complete, and fully convey the concept of the exemplary embodiments to those skilled in the art. The same reference numerals through the drawings denote the same or similar structures, and thus their detailed descriptions are omitted. In addition, the accompanying drawings are merely used for schematic illustration but are not necessarily drawn to scale.

Although relative terms such as "upper" and "lower" are used in the specification to describe the relative relationship of one component with respect to another component as shown in the figures, these terms are used in this specification only for convenience, for example, based on the exemplary directions shown in the figures. It is to be understood that if an apparatus shown in the figures is turned upside down, the described "upper" component will become a "lower" component. When a structure is "on" another structure, it may mean that the structure is integrally formed on the another structure, or that the structure is "directly" provided on the another structure, or that the structure is "indirectly" provided on the another structure via still another structure.

The terms "one", "a/an", "the", "said", and "at least one" are used to indicate the presence of one or more elements/components, etc. The terms "including/comprising" and "having" are used to indicate an opening inclusion and indicate that there may be other elements/components, etc., in addition to the listed elements/components, etc. The terms "first", "second" and "third" are only used as reference only, but not as a restriction on the number of their subjects.

In a touch panel with a circular touch region, as shown in FIG. 1, touch electrodes (S4-S7, S9-S13, S14-S17 and S19-S22 in FIG. 1) disposed in the middle of the touch region are generally square electrodes. In this design, the sizes of the touch electrodes disposed at the periphery (S1, S2, S3, S8, S13, S18, S23 and S24 in FIG. 1) are quite different from those of the touch electrodes disposed in the middle. For example, in FIG. 1, the areas of the touch electrodes disposed at the periphery are much larger than those of the touch electrodes disposed in the middle, and capacitance formed by the touch electrodes disposed at the periphery is quite different from capacitance formed by the touch electrodes disposed in the middle, which leads to a big difference between the touch signals produced by these two types of touch electrodes. As a result, the touch signals are poor in uniformity.

Figure 19:
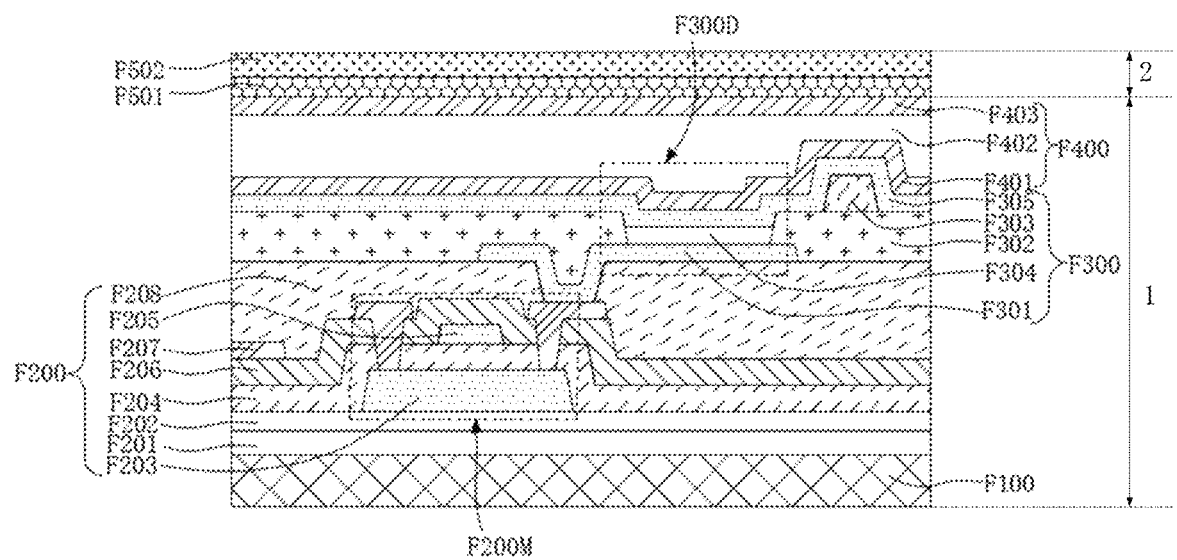
FIG. 19 is a schematic structural diagram of a touch panel according to an embodiment of the present disclosure.

The present disclosure provides a touch panel. Referring to FIG. 19, the touch panel includes a back plate 1 and a touch structure 2 that are laminated. The touch structure 2 includes a touch electrode layer F502, Referring to FIG. 2, the touch electrode layer F502 has a circular touch region A. FIG. 3 is an enlarged schematic diagram of the touch region. Referring to FIG. 3, the touch electrode layer F502 includes a plurality of touch electrodes 101 distributed in the touch region A, and each touch electrode 101 distal from the periphery of the touch region A has three side edges sequentially connected end to end.

In other words, in the touch panel provided in the present disclosure, the touch electrodes 101 disposed in the middle of the touch region A are triangular rather than square in overall shape, and in this design, the difference between the area of the touch electrode 101 disposed in the middle of the touch region A and the area of the touch electrode 101 disposed at the periphery of the touch region A can be reduced, thereby reducing the difference between the capacitance formed by the touch electrodes disposed in the middle and the capacitance formed by the touch electrodes disposed at the periphery. Thus, the difference between the touch signals produced by the touch electrodes disposed in the middle and the touch signals by the touch electrodes disposed at the periphery can be reduced, which can improve the uniformity of the touch signals.

The structure, principle and effect of the touch panel provided in the present disclosure will be further explained and illustrated below with reference to the accompanying drawings.

The touch panel provided in the present disclosure may include the back plate and the touch electrode layer F502 that are sequentially laminated, and the touch electrodes 101 are formed on the touch electrode layer F502. For example, the touch electrodes 101 may sense external touch operations according to a self-capacitance detection principle and produce corresponding touch signals. In other words, the touch panel provided in the present disclosure may adopt a flexible single-layer on cell (FSLOC) technology, which requires only one touch electrode layer F502 including the plurality of touch electrodes 101. A driver chip connected to the touch panel determines whether there is a touch operation based on the capacitance value, voltage value or current value produced by the touch electrodes 101. For example, when a finger touches the touch region A of the touch panel, the touch electrode 101 corresponding to the touched position may be coupled with the finger, such that the capacitance of the touch electrode 101 changes. The voltage change, current change or capacitance change caused by the change of capacitance value may be detected by the driver chip, and thus the touch operation produced by the finger may be determined.

Figure 2:
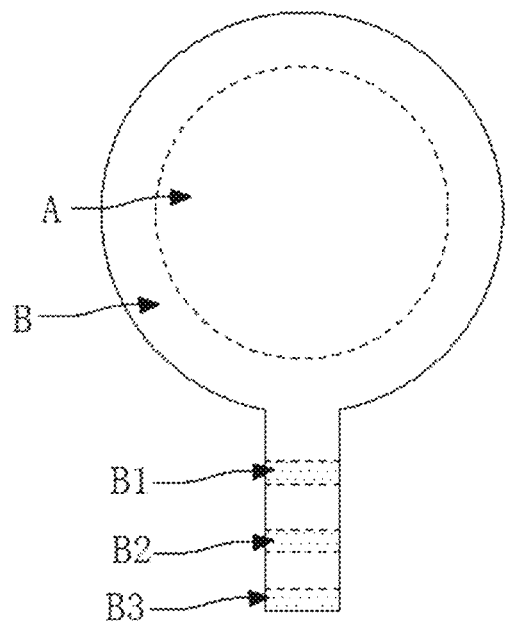
FIG. 2 is a top view of a structure of a touch panel according to an embodiment of the present disclosure.
Figure 3:
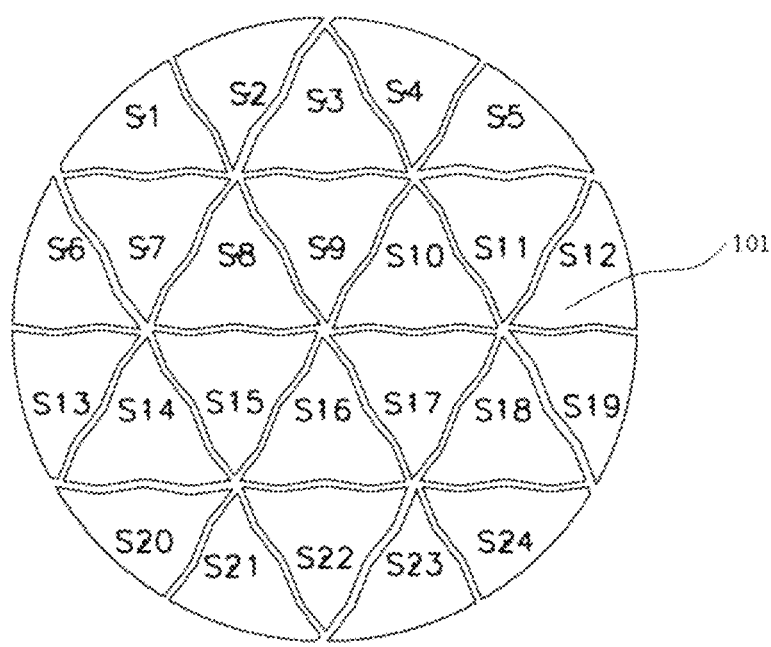
FIG. 3 is a schematic diagram showing structures and distribution of touch electrodes according to an embodiment of the present disclosure; in which S1-S24 represent different touch electrodes.

Optionally, referring to FIG. 2, the touch panel includes the touch region A and a peripheral wiring region B surrounding the touch region A. In the touch region A, the touch electrodes 101 may be disposed in the touch electrode layer F502, The touch electrodes 101 may be connected to the driver chip by touch leads 102, and the touch lead 102 may be at least partially disposed in the peripheral wiring region B.

Optionally, referring; to FIGS. 3 to 8, the plurality of touch electrodes 101 are divided into a plurality of touch electrode groups sequentially distributed around the center point of the touch region A, and in the plurality of touch electrode groups, the adjacent touch electrode groups are in rotationally symmetric distribution around the center point. That is, the plurality of touch electrodes are distributed into the plurality of touch electrode groups which are sequentially arranged around the center point of the touch region A, and the plurality of touch electrode groups are in rotationally symmetric distribution by taking the center point of the touch region A as the center of rotation. In other words, the touch region A of the touch panel may be divided into a plurality of touch sub-regions which are sequentially arranged around the center point of the touch region A. The touch sub-region is fan-shaped, and the touch electrodes 101 in the same touch electrode group are in a fan-shaped distribution. The touch sub-regions are in rotationally symmetric distribution by taking the center point of the touch region A as the center of rotation; and any touch sub-region may coincide with any other touch sub-region by rotating around the center point of touch region A. Correspondingly, the plurality of touch electrodes 101 of the touch panel may be distributed in different touch sub-regions, and the touch electrodes disposed in the same touch sub-region form one touch electrode group.

In this way, the plurality of touch electrodes 101 in the present disclosure are in rotationally symmetric distribution on the whole, which not only facilitates the design and preparation of the touch electrodes 101, but also helps make the areas of the touch electrodes 101 more uniform. The vertex angle of the touch sub-region may be set as required, for example, it may range from 30° to 90°. Since the touch sub-region is fan-shaped, the vertex angle of the touch sub-region is the central angle of the fan shape. Furthermore, the vertex angle of the touch sub-region may be 30°, 36°, 45°, 60° or 90°.

Exemplarily, referring to FIGS. 3, 4, 6, 7 and 8, in an implementation of the present disclosure, the plurality of touch electrodes 101 are divided into six touch electrode group with a rotation angle of 60°, That is, the plurality of touch electrodes are distributed into six touch electrode groups which are sequentially arranged around the center point of the touch region A, and the six touch electrode groups are in rotationally symmetric distribution with a rotation angle of 60° by taking the center point of the touch region A as the center of rotation, Each touch electrode group coincides with another adjacent touch electrode group after rotating by 60° around the center point of the touch region A. In this way, the touch electrodes 101 in any touch electrode group may be distributed within a fan-shaped region with an angular radian of 60°.

Taking FIG. 3 as an example, in three angles formed by the three side edges of the touch electrode 101 proximal to the center point, the angle proximal to the center point is 60°. In the touch sub-region, the touch electrode 101 most proximal to the center point of the touch region A has three angles, of which the vertex angle most proximal to the center point of the touch region A is 60°. With this arrangement, the shape of as many pixel electrodes as possible may be approximate to a regular triangle as a whole, which helps reduce the difference of size among the pixel electrodes and improve the uniformity of the pixel electrodes.

Figure 5:
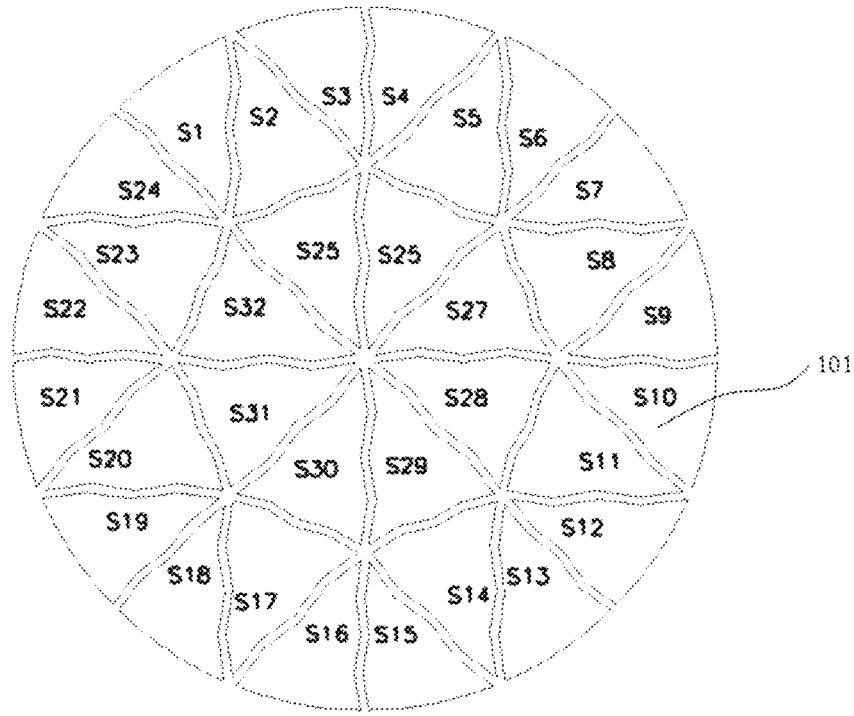
FIG. 5 is a schematic diagram showing structures and distribution of touch electrodes according to an embodiment of the present disclosure, in which S1-S32 represent different touch electrodes.
Figure 6:
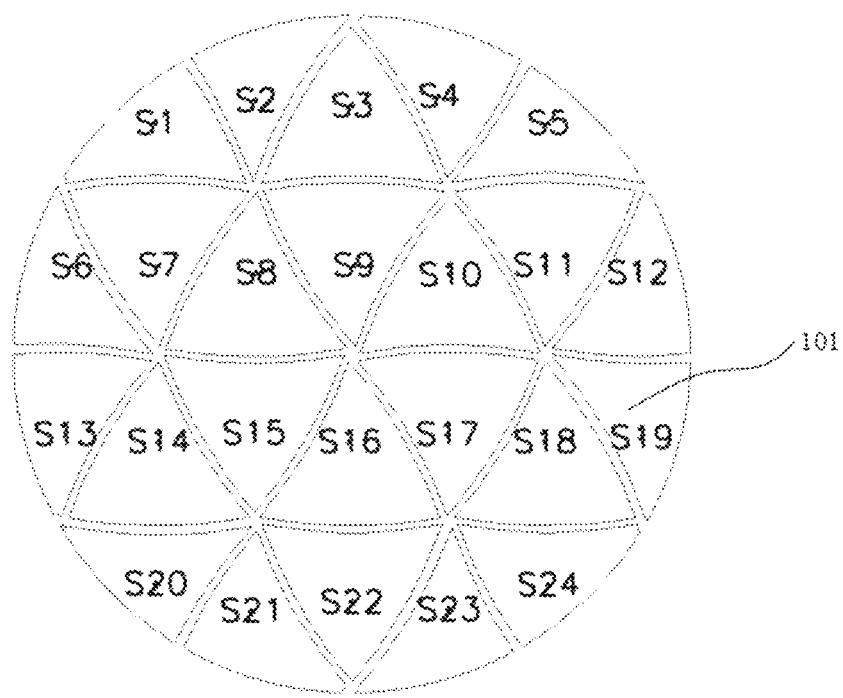
FIG. 6 is a schematic diagram showing structures and distribution of touch electrodes according to an embodiment of the present disclosure; in which S1-S24 represent different touch electrodes.
Figure 7:
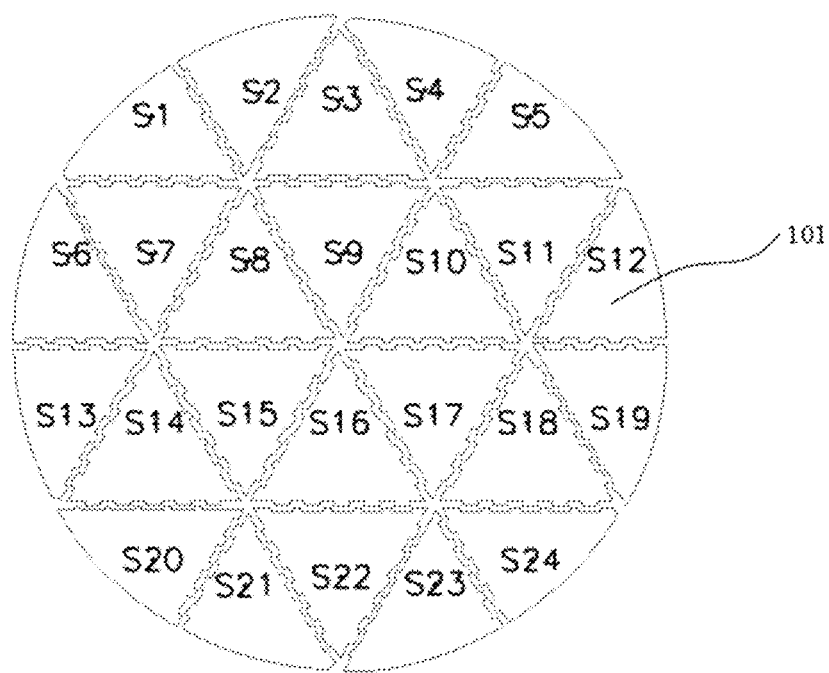
FIG. 7 is a schematic diagram showing structures and distribution of touch electrodes according to an embodiment of the present disclosure, in which S1-S24 represent different touch electrodes.

For another example, in another implementation of the present disclosure, referring to FIG. 5, the plurality of touch electrodes 101 are divided into eight touch electrode groups with a rotation angle of 45°. In the touch panel, the plurality of touch electrodes are distributed into eight touch electrode groups which are sequentially arranged around the center point of the touch region A, and the eight touch electrode groups are in rotationally symmetric distribution with a rotation angle of 45° by taking the center point of the touch region A as the center of rotation. Each touch electrode group coincides with another adjacent touch electrode group after rotating by 45° around the center point of touch region A. In this way, the touch electrodes 101 in any touch electrode group may be distributed within a fan-shaped region with an angular radian of 45°.

Taking FIG. 5 as an example, in the three angles formed by the three side edges of the touch electrode 101 proximal to the center point, the angle proximal to the center point is 45°. In the touch sub-region, the touch electrode 101 most proximal to the center point of the touch region A has three angles, of which the vertex angle most proximal to the center point of the touch region A is 45°. With this arrangement, the shape of as many pixel electrodes as possible may be approximate to an isosceles triangle as a whole, which helps reduce the difference of size among the pixel electrodes and improve the uniformity of the pixel electrodes. Moreover, it also helps increase the total number of the touch electrodes 101 and improve the touch accuracy.

Optionally, there are a plurality of touch electrodes 101 in each touch electrode group; and the number of touch electrodes 101 in each touch electrode group may be determined based on the size of the touch sub-region and the touch accuracy. In the case that the area of the touch sub-region is fixed, the smaller the area of the single touch electrode 101 is, the more touch electrodes 101 are in the touch electrode group, and the higher the touch accuracy is, Otherwise, the larger the area of the single touch electrode 101 is, the fewer touch electrodes 101 are in the touch electrode group, and the lower the touch accuracy is.

In an implementation of the present disclosure, referring to FIGS. 3 to 8, each touch electrode group includes four touch electrodes 101. In the four touch electrodes 101, one touch electrode 101 is proximal to the center point of the touch region A, two touch electrodes 101 are proximal to the periphery of touch region A, and the other touch electrode 101 is surrounded by other three touch electrodes 101. Thus, the touch panel has 4*N touch electrodes 101, where N is the number of the touch sub-regions. In some application scenarios where the requirement on the touch accuracy is low or the area of the touch region A is smaller, for example, in a smart watch, the requirement of a touch function can be met by providing four touch electrodes 101 in each touch electrode group.

Optionally, in the plurality of touch electrodes 101, the area of the touch electrode 101 with the largest area is 1~1.2 times the area of the touch electrode 101 with the smallest area, so as to ensure that the touch electrodes 101 have similar areas, thereby avoiding the big difference between the touch signals caused by the great difference of area among the touch electrodes 101.

Optionally, the plurality of touch electrodes 101 have the same area. In the present disclosure, the positions of the vertex angle and the side edges of each touch electrode 101 may be finely adjusted, or a vertex angle may be added to adjust the local shape of the touch electrode 101, so as to increase or decrease the area of the touch electrode 101, thereby making the areas of the touch electrodes 101 more uniform.

Figure 4:
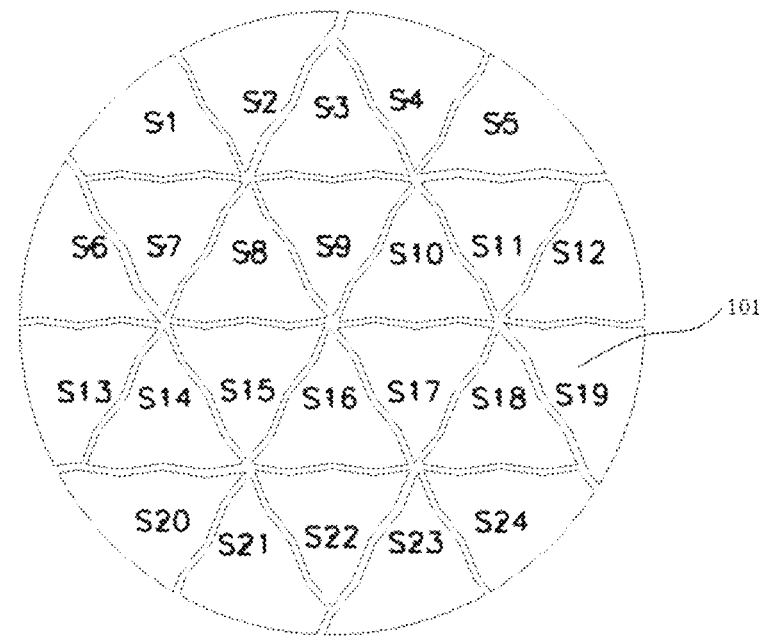
FIG. 4 is a schematic diagram showing structures and distribution of touch electrodes according to an embodiment of the present disclosure, in which S1-S24 represent different touch electrodes.

For example, through comparison between FIG. 3 and FIG. 4, on the basis of FIG. 3, the areas of the touch electrodes 101 disposed at the periphery of the touch region A in FIG. 4 are increased to some extent towards the direction distal from the touch region A, In some examples, the touch electrodes 101 are uniformly arranged by adjusting the shapes of the touch electrodes 101, so that the areas of the touch electrodes 101 are the same.

Optionally, referring to FIGS. 3 to 8, at least one side edge of the touch electrode 101 is a non-linear line. The non-linear line refers to lines other than a straight line. For example, the non-linear line is a wavy line, an arc line and a broken line. In this way, the number of straight edges may be reduced, and patterns of the touch electrode layer F502 in the macrostate are more imperceptible. Further, the side edges, proximal to each other, of the adjacent touch electrodes 101 are non-linear lines. That is, the edge, proximal to other touch electrodes 101, of any touch electrode 101 is a non-linear line. That is, the gap between two adjacent touch electrodes 101 may be a curved gap. In this way, the macroscopically visible patterns may be better eliminated.

In some implementations, the arc line may be a smooth arc line. In other implementations, the broken line may be straight line segments that are bent back and forth, and an angle between every two adjacent straight line segments in the broken line may be an acute angle, an obtuse angle or a right angle.

It can be understood that in the touch panel, the edges of the touch electrodes 101 may be present as one type of non-linear lines or various different types of non-linear lines, as long as the macroscopically visible patterns can be eliminated. For example, in the three side edges of the same touch electrode 101, two side edges are arc lines and one side edge is a broken line.

Optionally, the width of the gap between adjacent touch electrodes 101 is constant, so that the touch electrodes 101 are arranged more orderly, and touch leads may be conveniently arranged by taking advantage of the gap.

Figure 8:
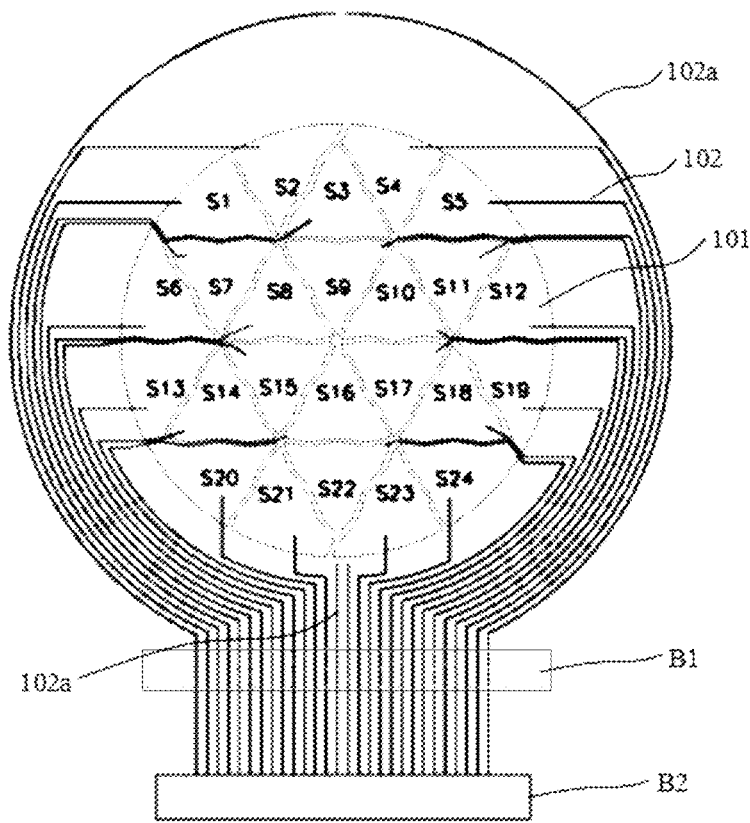
FIG. 8 is a schematic diagram showing a structure and distribution of a touch electrode layer according to an embodiment of the present disclosure, in which S1-S24 represent different touch electrodes.
Figure 9:
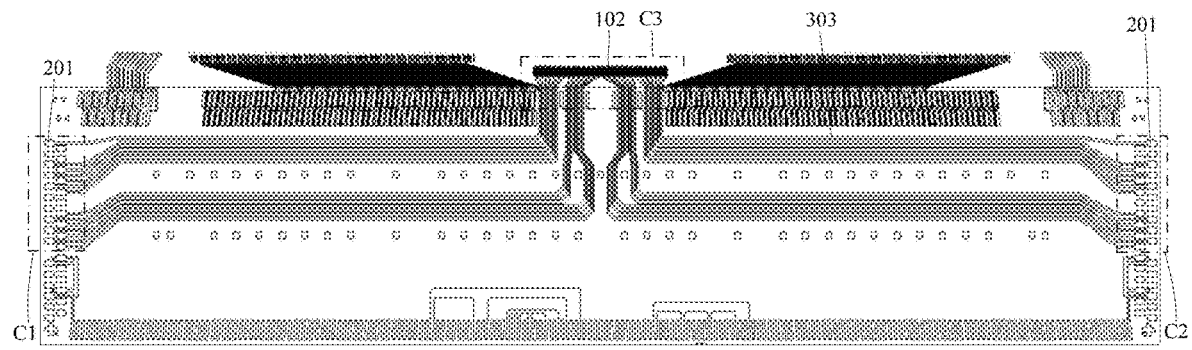
FIG. 9 is a schematic structural diagram of a chip bonding region according to an embodiment of the present disclosure.
Figure 10:
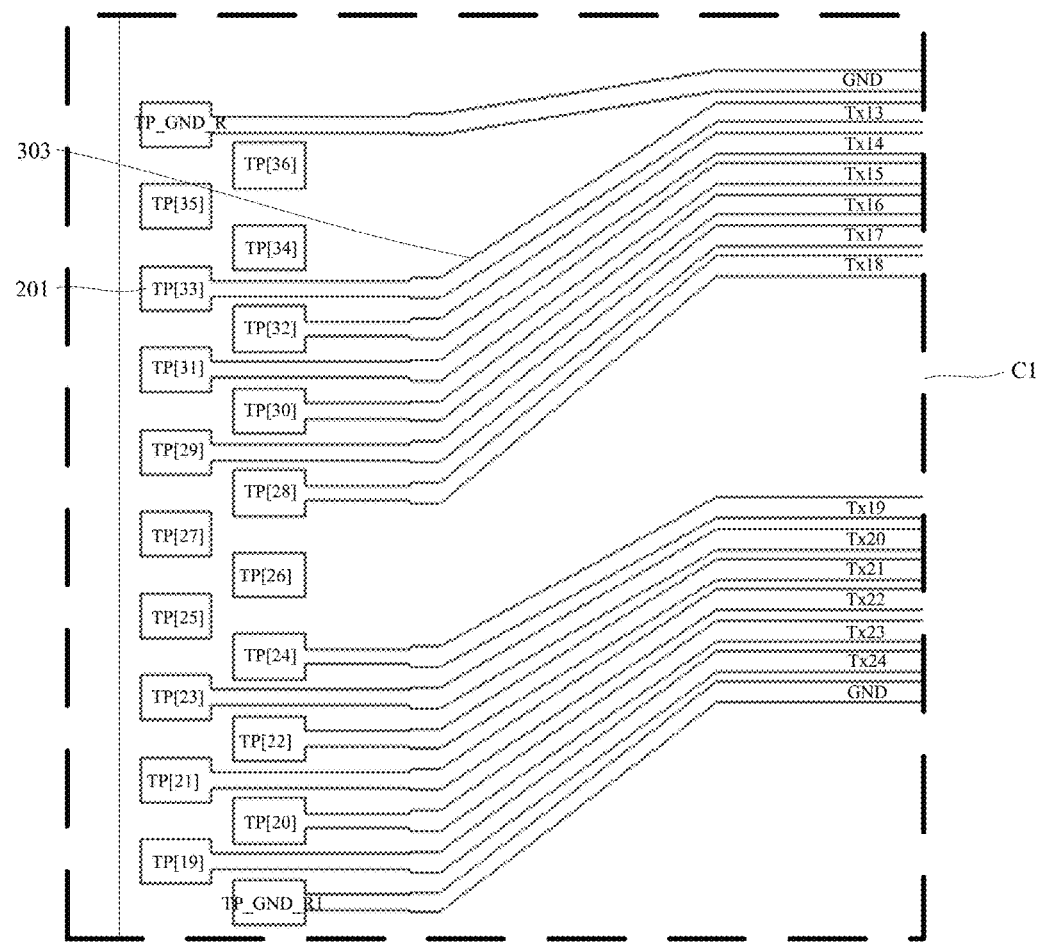
FIG. 10 is a partially-enlarged schematic diagram of position C1 in FIG. 9.
Figure 11:
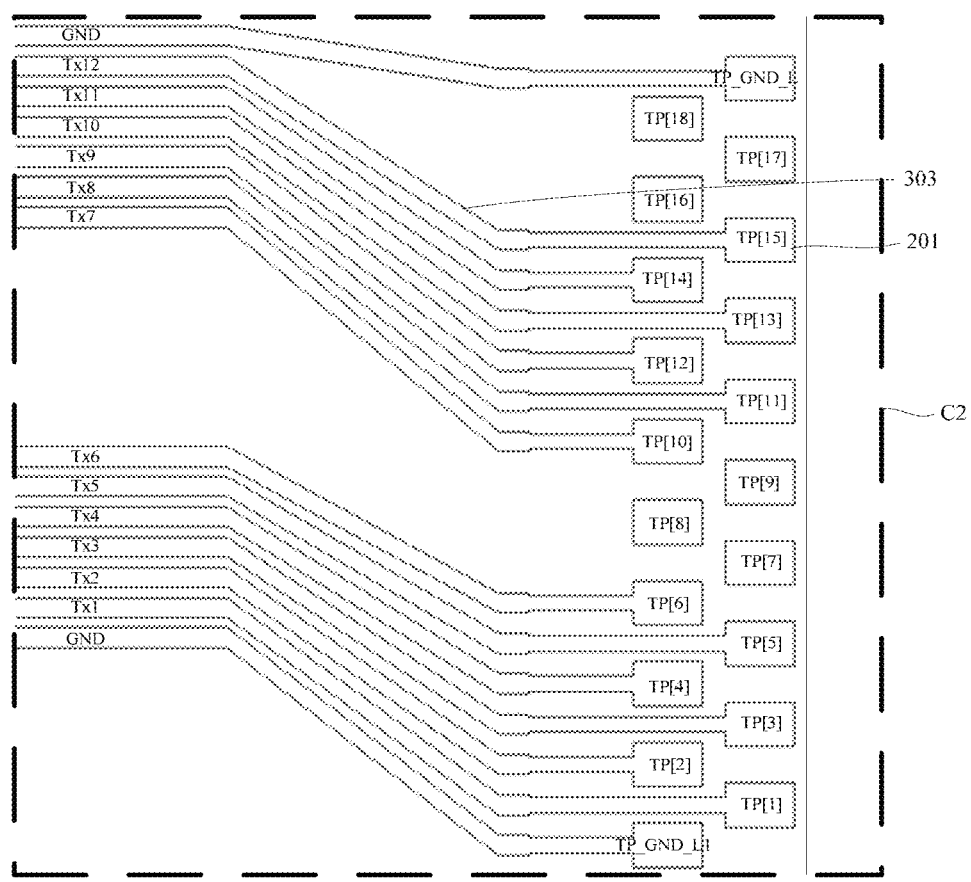
FIG. 11 is a partially-enlarged schematic diagram of position C2 in FIG. 9.
Figure 12:
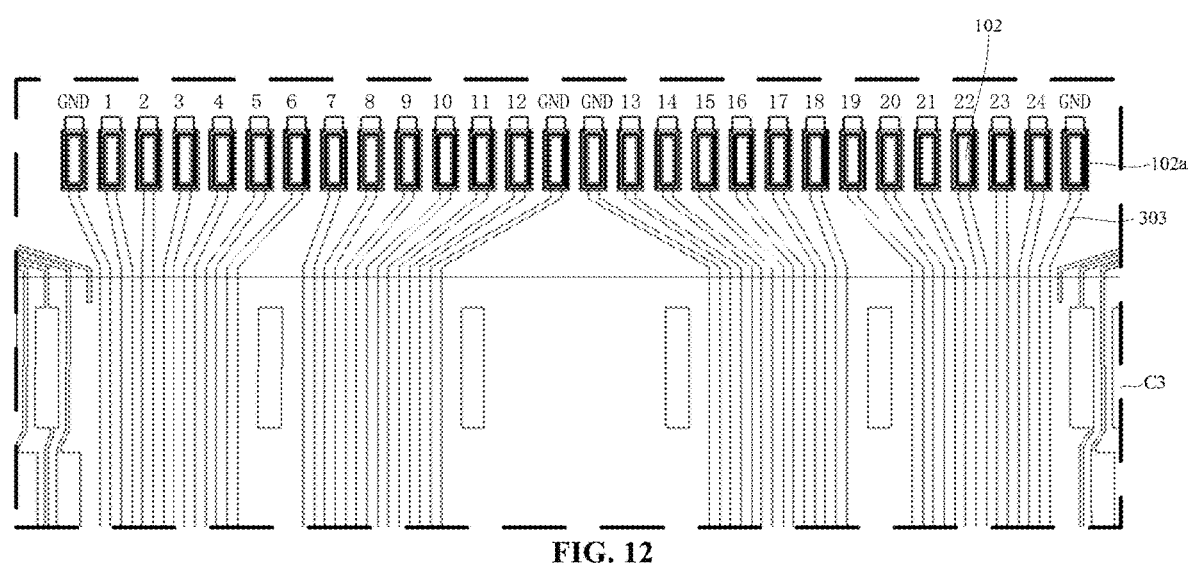
FIG. 12 is a partially-enlarged schematic diagram of position C3 in FIG. 9.
Figure 13:
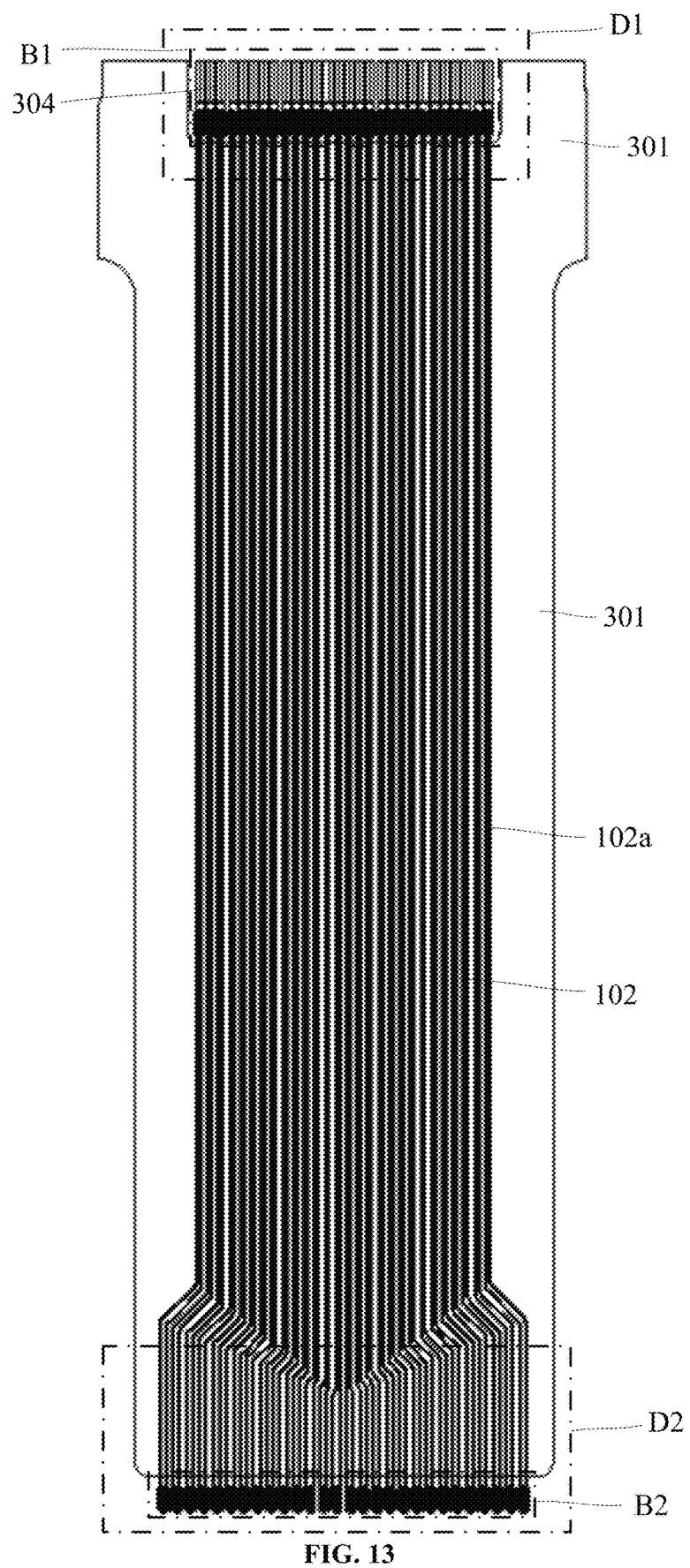
FIG. 13 is a schematic structural diagram of a source/drain metal layer and a touch electrode layer between a bending region and a chip bonding region according to an embodiment of the present disclosure.
Figure 14:
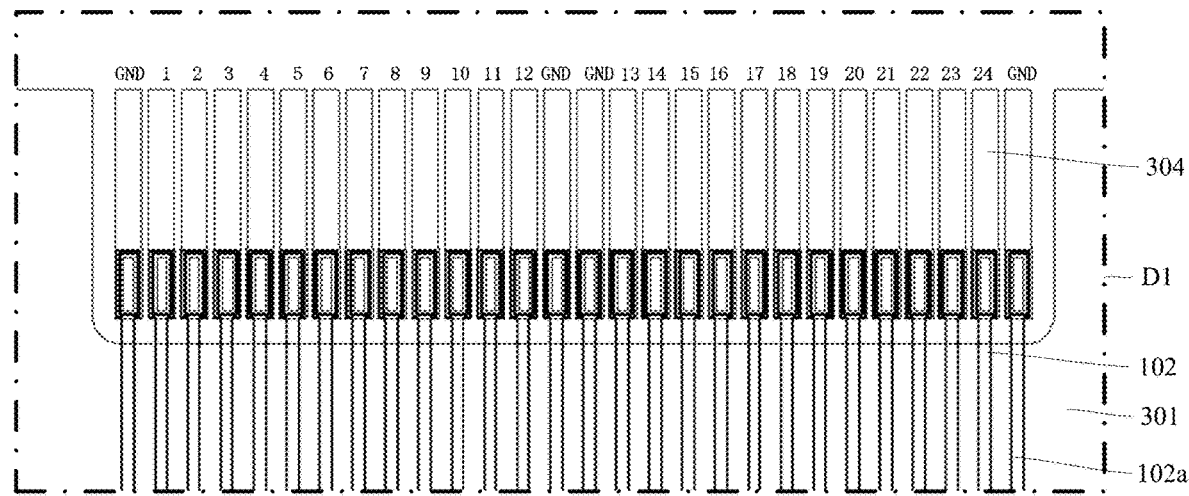
FIG. 14 is a partially-enlarged schematic diagram of position D1 in FIG. 13.
Figure 15:
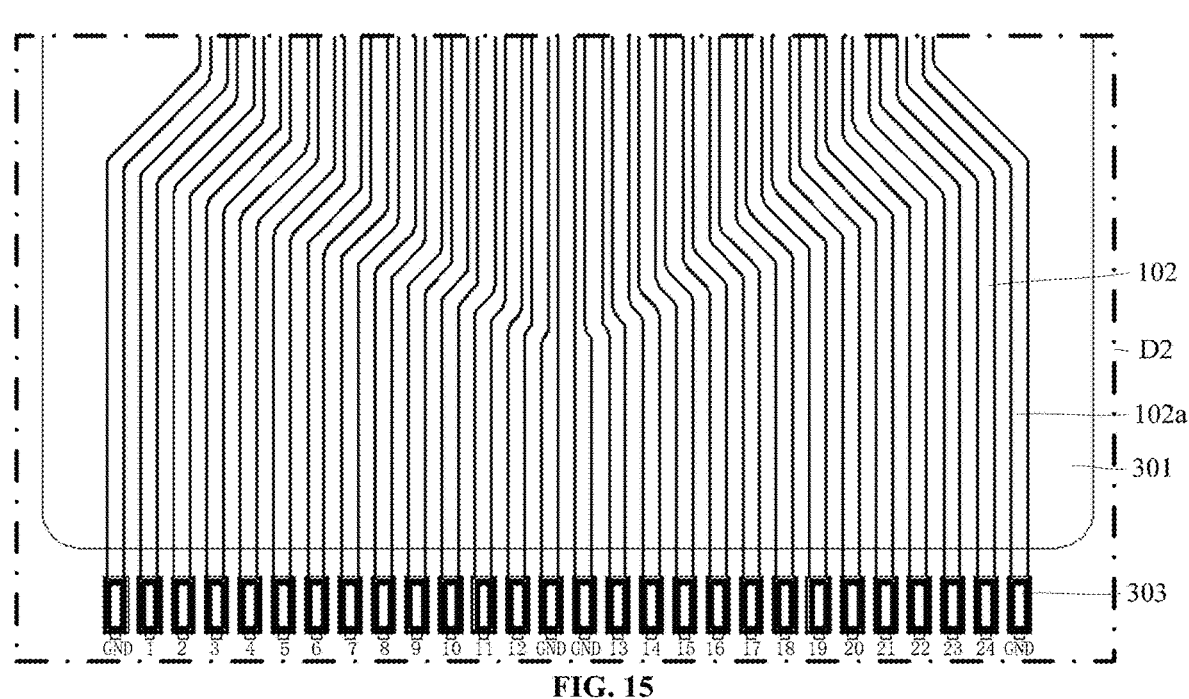
FIG. 15 is a partially-enlarged schematic diagram of position D2 in FIG. 13.
Figure 16:
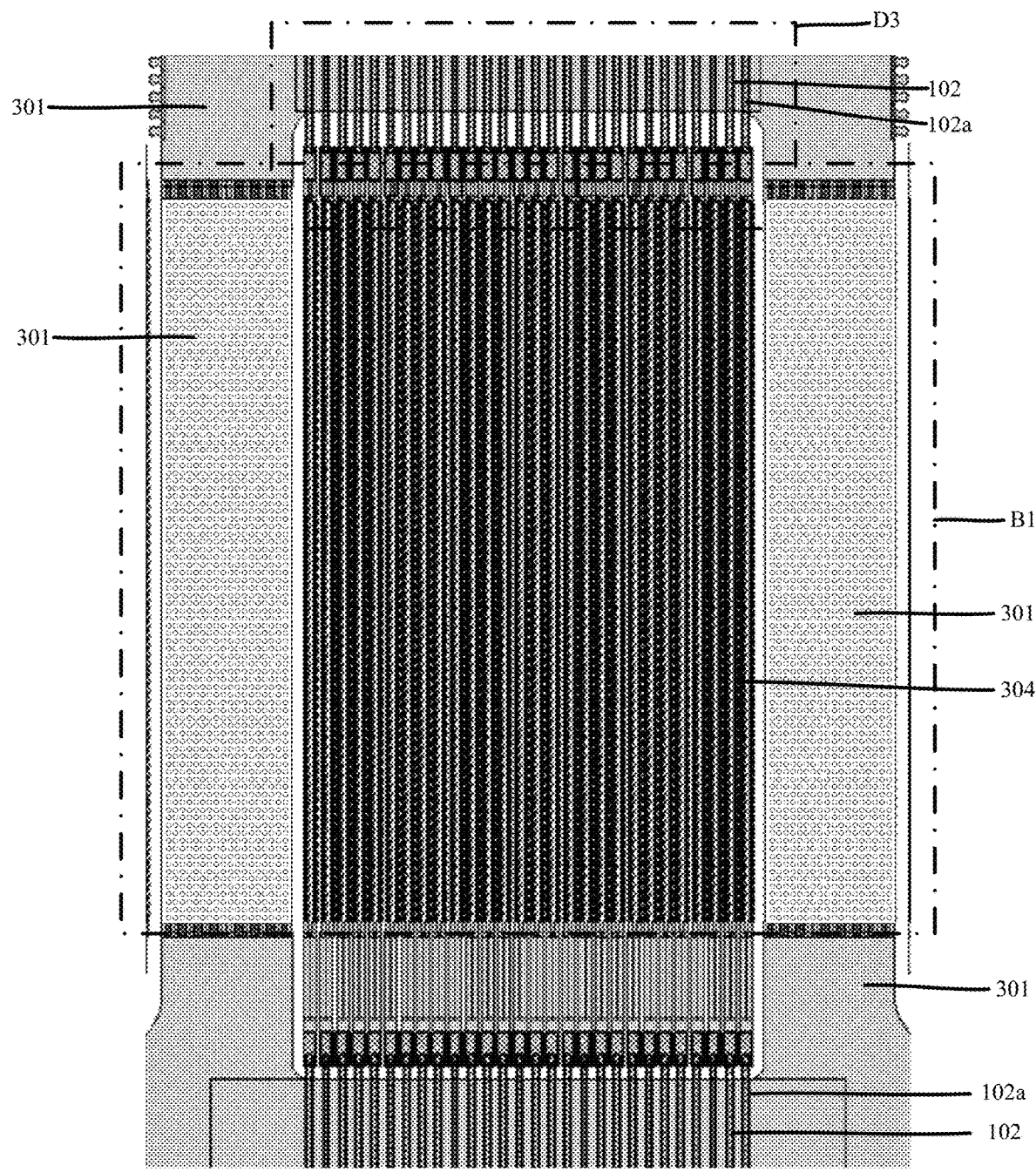
FIG. 16 is a schematic structural diagram of a source/drain metal layer and a touch electrode layer at a bending position according to an embodiment of the present disclosure.
Figure 17:
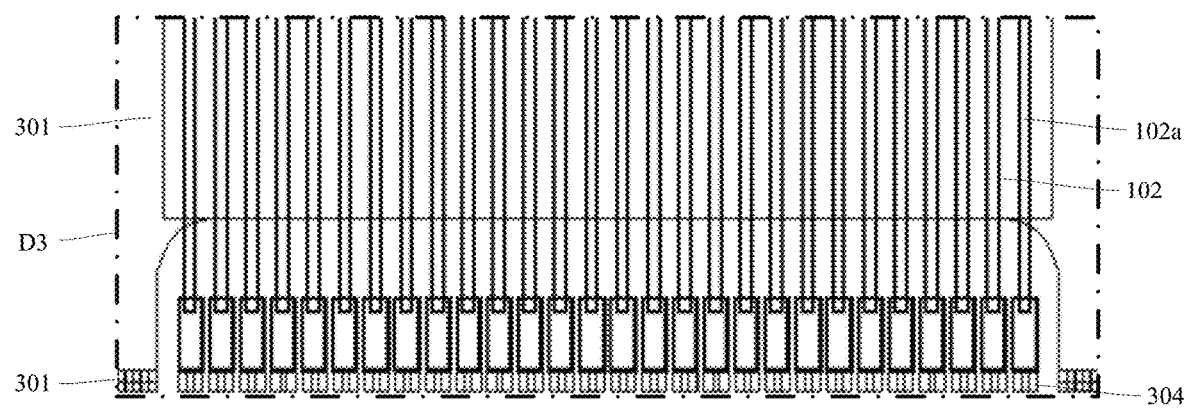
FIG. 17 is a partially-enlarged schematic diagram of position D3 in FIG. 16.

Exemplarily, referring to FIG. 8, the touch panel may further include a plurality of touch leads 102, and the touch leads 102 are configured to be electrically connected to the touch electrodes 101, such that the touch electrodes 101 are connected to an external control component through the touch leads 102. In the touch panel, the touch electrode layer F502 may be adopted to form the touch leads 102, that is, the touch leads 102 and the touch electrodes 101 are arranged in the same layer. Exemplarily, in an implementation of the present disclosure, referring to FIG. 8, the touch electrode layer F502 further includes a plurality of touch leads 102 and the plurality of touch leads 102 are connected to the plurality of touch electrodes 101 in one-to-one correspondence.

As shown in FIG. 8, at least part of the plurality of touch leads 102 extend out of the touch region A along the gap between adjacent touch electrodes 101. In this implementation, the touch leads 102 connected to the touch electrodes 101 disposed at the periphery of the touch region A may be completely disposed in the peripheral wiring region B, and the touch leads 102 connected to the touch electrodes 101 disposed distal from the periphery of the touch region A extend from the touch region A to the peripheral wiring region B through the gap between the adjacent touch electrodes 101.

Exemplarily, in the touch panel, a wiring layer may be additionally provided to form the touch leads 102. It can be understood that when a wiring layer is additionally provided, the touch leads 102 may be completely disposed in the wiring layer, or may be partially disposed in the wiring layer and partially disposed in the touch electrode layer F502.

For example, the touch panel further includes a touch wiring layer and a touch insulating layer. The touch wiring layer and the touch electrode layer are disposed on two opposite sides of the touch insulating layer, and the touch insulating layer is provided with a plurality of via holes. The back plate, the touch wiring layer, the touch insulating layer and the touch electrode layer are sequentially laminated. The touch wiring layer is provided with a plurality of touch leads and the plurality of touch leads are connected to the plurality of touch electrodes in one-to-one correspondence through the via holes penetrating the touch insulating layer. Furthermore, the touch electrode layer further includes a plurality of auxiliary touch leads distributed in the peripheral wiring region. The plurality of auxiliary touch leads are in one-to-one correspondence with the plurality of touch leads, the auxiliary touch leads and the corresponding touch leads are overlapped in the peripheral wiring region and connected in parallel through the via holes, thereby reducing the impedance of the touch leads.

In some embodiments, referring to FIG. 2, the back plate may be a flexible back plate, that is, a portion of the back plate or the entire back plate is bendable. In the peripheral wiring region B, the touch panel is provided with a bending region B1 and a bonding region, and bonding pads are disposed in the bonding region. At least part of the bonding pads may be electrically connected to the touch leads 102. The touch panel may be bent in the bending region B1 to reduce the frame of an electronic device to which the touch panel is applied. It can be understood that the touch leads 102 may directly extend through the bending region B1, or pass through the bending region B1 by bridging across other metal layers. For example, a metal layer may be provided in the back plate, and the metal layer in the bending region B1 may be provided with jumper leads. The touch lead 102 may include two segments disposed on both sides of the bending region B1, and the two segments are connected to each other through the jumper lead. In this way, the touch leads 102 may bridge across the bending region B1 through the jumper leads disposed in the bending region B1, which prevents the touch leads 102 from being damaged or even broken due to an excessively large curvature when the touch panel is bent.

Optionally, referring to FIG. 2, the touch panel may be connected to a circuit board and a driver chip by means of chip on panel (COP). In this implementation, the bonding region may include a chip bonding region B2 and a circuit board bonding region B3. The chip bonding region B2 and the touch region A are disposed on two sides of the bending region B1 respectively, and the circuit board bonding region B3 is disposed on the side of the chip bonding region B2 distal from the bending region B1. Chip bonding pads bonded to the driver chip are disposed in the chip bonding region B2, and circuit board bonding pads bonded to the circuit board are disposed in the circuit board bonding region B3. The chip bonding pads are partially connected to the touch leads, and partially connected to the circuit board bonding pads.

Moreover, in the touch panel, in addition to disposing the driver chip in the above-mentioned COP way, the driver chip and the circuit board may also be arranged in other ways. For example, the bonding region may include the circuit board bonding region in which the circuit board bonding pads bonded to the circuit board are disposed, at least part of the circuit board bonding pads are connected to the touch leads, and the driver chip is bonded onto the circuit board. Furthermore, the circuit board may be a flexible printed circuit board, and the circuit board to which the driver chip is bonded may be a chip-on film (COF).

Optionally, the touch panel may further include a protective layer disposed on the side of the touch electrode layer distal from the back plate, to protect the touch electrode layer. Optionally, the protective layer may be made from an organic material, for example, polyimide.

In some implementations, the back plate may be a display panel, such as an LCD display panel, a micro-LED display panel or an OLED display panel, such that the touch panel provided by the present disclosure is a touch panel with a display function, that is, a touch display panel. It can be understood that the back plate may also be a substrate without a display function, for example, a transparent glass substrate.

The structure of the back plate is exemplarily introduced below by taking the OLED display panel as an example of the back plate.

Referring to FIG. 19, the back plate may include a base substrate F100, a drive circuit layer F200 and a pixel layer F300 that are sequentially laminated.

The base substrate F100 may be made from an inorganic material or an organic material. For example, the base substrate F100 may be made from glass such as soda-lime glass, quartz glass and sapphire glass, or made from metals such as stainless steel, aluminum and nickel. For example, the base substrate F100 may be made from polymethyl methacrylate (PMMA), polyvinyl alcohol (PVA), polyvinyl phenol (PVP), polyether sulfone (PES), polyimide, polyamide, polyacetal, poly carbonate (PC), polyethylene terephthalate (PET), polyethylene naphthalate (PEN) or a combination thereof.

In another implementation of the present disclosure, the base substrate F100 may also be a flexible base substrate F100. For example, the base substrate F100 may be made from polyimide (P1), The base substrate F100 may also be compounded by multiple layers of materials. For example, the base substrate F100 may include a bottom film layer, a pressure-sensitive adhesive layer, a first polyimide layer and a second polyimide layer that are sequentially laminated.

Optionally, in the drive circuit layer F200, a pixel driving circuit may include a transistor F200M and a storage capacitor. For example, the transistor F200M may be a thin film transistor, and the thin film transistor may be a top-gate type thin film transistor, a bottom-gate type thin film transistor or a double-gate type thin film transistor. An active layer of the thin film transistor may be made from an amorphous silicon semiconductor material, a low-temperature polysilicon semiconductor material, a metal oxide semiconductor material, an organic semiconductor material or other types of semiconductor materials. The thin film transistor may be an N-type thin film transistor or a P-type thin film transistor. For example, the thin film transistor may further be a low-temperature polysilicon transistor.

Optionally, the pixel driving circuit may include a plurality of transistors, and any two of the plurality of transistors may be of the same or different types. Exemplarily, in an implementation, in one pixel driving circuit, part of the transistors are N-type transistors and the other the transistors are P-type transistors. For example, in one pixel driving circuit, active layers of part of the transistors are made from a low-temperature polysilicon semiconductor material, and active layers of the other the transistors are made from a metal oxide semiconductor material.

The transistor may have a first terminal, a second terminal and a control terminal. One of the first terminal and the second terminal may be the source of the transistor, and the other one may be the drain of the transistor, and the control terminal may be the gate of the transistor. The source and the drain of the transistor are opposite and interchangeable. When the working state of the transistor changes, for example, when the direction of current changes, the source and the drain of the transistor may be exchanged.

Optionally, the drive circuit layer F200 may include a semiconductor layer F203, a gate insulating layer F204, a gate layer F205, an interlayer dielectric layer F206, a source/drain metal layer F207 and the like that are laminated between the base substrate F100 and the pixel layer F300. For example, the thin film transistor and the storage capacitor may be formed by films such as a semiconductor layer F203, a gate insulating layer F204, a gate layer F205, an interlayer dielectric layer F206 and a source/drain metal layer F207. The positional relationship of the film layers may be determined based on the film structure of the thin film transistor. For example, if the thin film transistor is a top-gate type thin film transistor, the drive circuit layer F200 includes a semiconductor layer F203, a gate insulating layer F204, a gate layer F205, an interlayer dielectric layer F206 and a source/drain metal layer F207 that are sequentially laminated. For another example, if the thin film transistor is a bottom-gate type thin film transistor, the drive circuit layer F200 may include a gate layer F205, a gate insulating layer F204, a semiconductor layer F203, an interlayer dielectric layer F206 and a source/drain metal layer F207 that are sequentially laminated.

Optionally, the drive circuit layer F200 may also be of a structure with a double gate layers F205, that is, the gate layer F205 may include a first gate layer and a second gate layer, and the gate insulating layer F204 may include a first gate insulating layer that isolates the semiconductor layer F203 from the first gate layer and a second gate insulating layer that isolates the first gate layer from the second gate layer. For example, in an implementation of the present disclosure, the drive circuit layer F200 may include a semiconductor layer F203, a first gate insulating layer, a first gate layer, a second gate insulating layer, a second gate layer, an interlayer dielectric layer F206, and a source/drain metal layer F207 that are sequentially laminated on a side of the base substrate F100.

Optionally, the drive circuit layer F200 may further include a passivation layer, and the passivation layer may be disposed on the surface of the source/drain metal layer F207 distal from the base substrate F100 to protect the source/drain metal layer F207.

Optionally, the drive circuit layer F200 may further include a buffer material layer disposed between the base substrate F100 and the semiconductor layer F203, and both of the semiconductor layer F203 and the gate layer F205 are disposed on the side of the buffer material layer distal from the base substrate F100. The buffer material layer may be made from an inorganic insulating material such as silicon oxide and silicon nitride. The buffer material layer may be a single inorganic material layer or multiple laminated inorganic material layers. For example, referring to FIG. 3, the buffer material layer may include a barrier layer F201 proximal to the base substrate F100 and a buffer layer F202 disposed on the side of the barrier layer F201 distal from the base substrate F100. The barrier layer F201 is configured to prevent ions and other components in the base substrate F100 from permeating the drive circuit layer F200, such that the performance of the drive circuit layer F200 may be kept stable. The buffer layer F202 may improve the bonding force between the drive circuit layer F200 and the base substrate F100 and provide a stable environment for the drive circuit layer F200.

Optionally, the drive circuit layer F200 may further include a planarization layer F208 disposed between the source/drain metal layer F207 and the pixel layer F300, and the planarization layer F208 may provide a planarized surface for pixel electrodes, thereby facilitating fabrication of the pixel electrodes. Optionally, the planarization layer F208 may be made from an organic material.

Optionally, the pixel layer F300 may be disposed on the side of the drive circuit layer F200 distal from the base substrate F100. For example, the pixel layer F300 includes a pixel electrode layer F301, a pixel definition layer F302, a support column layer F303, an organic light-emitting functional layer F304 and a common electrode layer F305 that are sequentially laminated. The pixel electrode layer F301 is provided with a plurality of pixel electrodes in the display region. The pixel definition layer F302 is provided with a plurality of pixel openings in the display region, and the plurality of pixel openings are in one-to-one correspondence with the plurality of pixel electrodes, and the pixel opening is configured to expose at least part of the corresponding pixel electrode. The support column layer F303 is provided with a plurality of support columns in the display region, and the support columns are disposed on the surface of the pixel definition layer F302 distal from the base substrate F100, so as to support a fine metal mask (FMM) in the evaporation process. The organic light-emitting functional layer F304 at least covers the pixel electrode exposed by the pixel definition layer F302. For example, the organic light-emitting functional layer F304 includes an organic electroluminescent material layer. For another example, the organic light-emitting functional layer F304 includes one or more of a hole injection layer, a hole transport layer, an electron block layer, a hole block layer, an electron transport layer and an electron inject layer. The film layers of the organic light-emitting functional layer F304 may be prepared by the evaporation process, and a fine metal mask or an open mask may be adopted to define patterns of each film layer during evaporation. The common electrode layer F305 may cover the organic light-emitting functional layer F304 in the display region. In this way, the pixel electrode, the common electrode layer F305, and the organic light-emitting functional layer F304 disposed between the pixel electrode and the common electrode layer F305 form an organic light-emitting diode (OLED) F300D. Any OLED F300D may be used as one sub-pixel of the back plate.

In some implementations, the pixel layer F300 may further include a light extraction layer disposed on the side of the common electrode layer F305 distal from the base substrate F100 to improve the light extraction efficiency of the OLED.

Optionally, the back plate may further include a thin film encapsulation layer F400 disposed on the surface of the pixel layer F300 distal from the base substrate F100. For example, the thin film encapsulation layer F400 includes inorganic encapsulation layers and organic encapsulation layers that are alternately laminated. The inorganic encapsulation layer may effectively block external moisture and oxygen, thereby avoiding material degradation caused by invasion of water and oxygen into the organic light-emitting functional layer F304.

Optionally, the edge of the inorganic encapsulation layer may be disposed in the peripheral region. The organic encapsulation layer is disposed between two adjacent inorganic encapsulation layers to achieve planarization and reduce the stress between the inorganic encapsulation layers. The edge of the organic encapsulation layer is disposed between the display region and the edge of the inorganic encapsulation layer. Exemplarily, the thin film encapsulation layer F400 includes a first inorganic encapsulation layer F401, an organic encapsulation layer F402 and a second inorganic encapsulation layer F403 that are sequentially laminated on the side of the pixel layer F300 distal from the base substrate F100.

A touch insulating layer F501 may be provided between the thin film encapsulation layer and the touch electrode layer F502, and the touch insulating layer F501 may made from an inorganic material, such as silicon nitride, silicon oxide or silicon oxynitride. Via holes may be formed in the touch insulating layer F501, and the touch leads are connected to the source/drain metal layer through the via holes, such that the touch leads 102 may bridge cross the bending region B1 by means of the juniper leads 304 disposed in the source/drain metal layer.

The touch electrode layer F502 may be a film layer formed by one or more layers of metal materials. For example, the touch electrode layer F502 includes a titanium layer, an aluminum layer and a titanium layer that are laminated. After a touch metal material layer is formed, the touch metal material layer may be patterned by a photo-etching process to form the touch electrode layer 502.

Referring to FIG. 8, in the peripheral wiring region B, the touch leads 102 are arranged along a curved trend, and the plurality of touch leads 102 are converged to the side proximal to the bending region B1 and extend toward the bending region B1. Referring to FIGS. 13, 14, 16 and 17, the source/drain metal layer is provided with jumper leads 304 passing through the bending region and the touch leads 102 are disconnected outside the bending region B1 and connected to the jumper leads 304 through the via holes. In this way, two disconnected segments of the touch lead 102 are connected by the jumper lead 304 to pass through the bending region B1. The touch leads 102 continue to extend in a direction going distal from the touch region A to the chip bonding region B2, and the touch leads 102 are connected to the chip bonding pads 201 in the chip bonding region B2. The chip bonding pads 201 may be bonded to the driver chip.

Optionally, the driver chip may be a touch and display driver integration (TDDI) chip.

Optionally, referring to FIGS. 8 and 12-18, the plurality of touch leads 102 may further include a plurality of auxiliary leads 102*a* which are not connected to the touch electrodes 101. The auxiliary leads 102*a* may be configured to load a power voltage, for example, a grounding voltage GND, to provide signal shielding for the touch leads 102. For example, the plurality of touch leads 102 may include four auxiliary leads 102*a*; and in the plurality of touch leads 102 arranged side by side, two auxiliary leads 102*a* are disposed on two outermost sides of the plurality of touch leads 102, and two auxiliary leads 102*a* are disposed in the middle of the plurality of touch leads 102.

Optionally, referring to FIGS. 13 to 18, in the peripheral wiring region B, the source/drain metal layer may be further provided with touch shielding lines 301, and the touch shielding lines 301 are overlapped with the touch leads 102. The touch shielding lines 301 may be configured to load the drive voltage VDD so as to shield the interference from signals of the display panel to touch signals. For example, the touch shielding lines 301 may be disposed in the bending region B1 and disposed on two sides of the plurality of touch leads 102, so as to further shield interference from noise signals to the touch signals.

Figure 18:
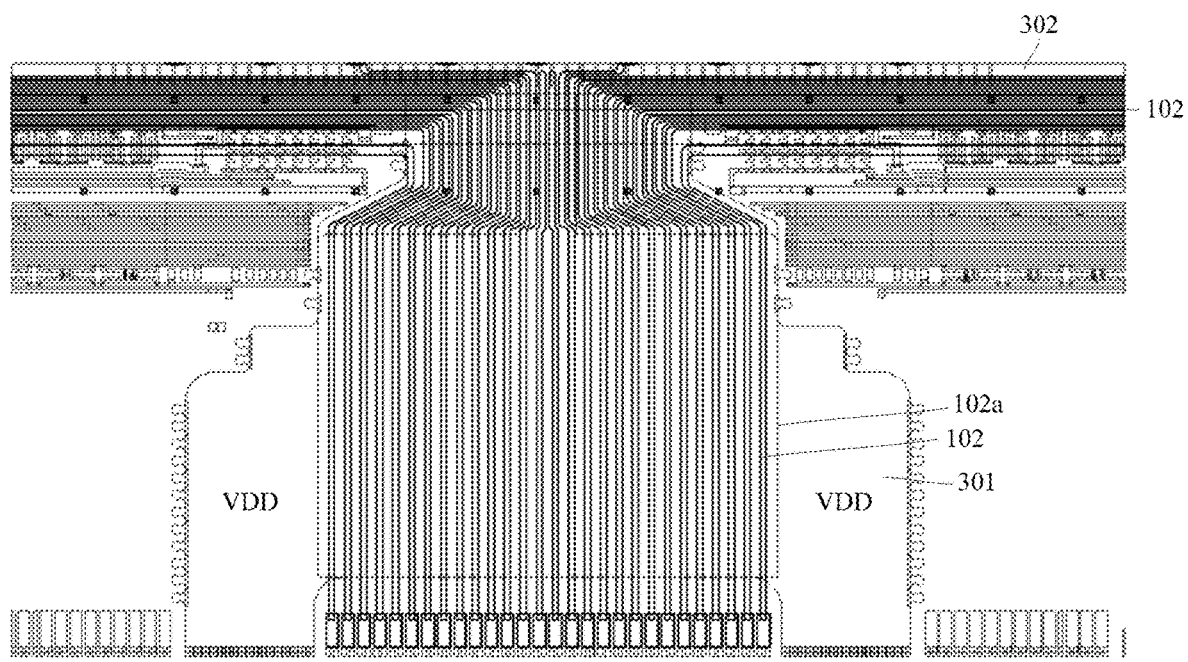
FIG. 18 is a schematic structural diagram of a touch panel between a bending region and a touch region according to an embodiment of the present disclosure.

Optionally, referring to FIG. 18, in the peripheral wiring region B, the touch leads 102 may be overlapped with the common electrode 302. The common electrode 302 may be configured to load the grounding voltage GND or a common voltage VSS, to shield interference from the signals of the display panel to the touch signals.

Optionally, referring to FIGS. 9 to 12, chip bonding pads 201 and connecting traces 303 may be disposed in the chip bonding region B2, The chip bonding pads 201 are configured to be bonded to the driver chip and to be connected to the connecting traces 303, and part of the connecting traces 303 may be connected to the touch leads 102. For example, the connecting traces 303 may be disposed in the gate layer, one end of the connecting trace 303 is connected to the chip bonding pad 201 through the via hole, and the other end of the connecting traces 303 is connected to the touch lead 102 through the via hole, such that the touch leads 102 are connected to the chip bonding pads 201 through the connecting traces 303.

An embodiment of the present disclosure further provides an electronic device, including any of the touch panels described above. The electronic device may be a smart watch, a smart bracelet or other electronic devices with a circular touch region.

Other embodiments of the present disclosure are conceivable to those skilled in the art from consideration of the description and practice of the present disclosure. The present disclosure is intended to cover any variations, uses, or adaptations of the present disclosure following the general principles thereof and including common knowledge or commonly used technical means which are not disclosed herein. The description and embodiments are to be considered as exemplary only, and the true scope and spirit of the present disclosure are indicated by the appended claims.

What is claimed is:

1. A touch panel, comprising a back plate, a touch electrode layer disposed on a side of the back plate, a touch insulating layer, and a touch wiring layer, wherein
the touch electrode layer has a circular touch region, and comprises a plurality of touch electrodes and a plurality of auxiliary touch leads distributed in a peripheral wiring region, wherein the plurality of touch electrodes are distributed in the touch region, and any touch electrode distal from a periphery of the touch region has three side edges sequentially connected end to end; and
the touch wiring layer and the touch electrode layer are disposed on two opposite sides of the touch insulating layer, the touch insulating layer is provided with a plurality of via holes, and the touch wiring layer comprises a plurality of touch leads, wherein the plurality of touch leads are connected to the plurality of touch electrodes through the via holes in one-to-one correspondence, and comprise a plurality of auxiliary leads, wherein the plurality of auxiliary leads are not connected to the touch electrodes and configured to load a power voltage; and the plurality of auxiliary touch leads are in one-to-one correspondence with the plurality of touch leads, the auxiliary touch leads and the corresponding touch leads are overlapped in the peripheral wiring region and connected in parallel through the via holes;
a metal layer is provided in the back plate, the touch panel is provided with a bending region, wherein the metal layer in the bending region is provided with jumper leads, the touch lead comprises two segments disposed on both sides of the bending region, and the two segments are connected to each other through the jumper lead.

2. The touch panel according to claim 1, wherein the plurality of touch electrodes are divided into a plurality of touch electrode groups, wherein the plurality of touch electrode groups are sequentially distributed around a center point of the touch region, and adjacent touch electrode groups of the plurality of touch electrode groups are in rotationally symmetric distribution around the center point.

3. The touch panel according to claim 2, wherein the touch electrodes in the touch electrode group are in a fan-shaped distribution.

4. The touch panel according to claim 3, wherein the plurality of touch electrodes are divided into six touch electrode groups with a rotation angle of 60°.

5. The touch panel according to claim 4, wherein in three angles formed by the three side edges of the touch electrode proximal to the center point, the angle proximal to the center point is 60°.

6. The touch panel according to claim 3, wherein the plurality of touch electrodes are
divided into eight touch electrode groups with a rotation angle of 45°.

7. The touch panel according to claim 6, wherein in three angles formed by the three side edges of the touch electrode proximal to the center point, the angle proximal to the center point is 45°.

8. The touch panel according to claim 3, wherein the touch electrode group comprises four touch electrodes, wherein one touch electrode is proximal to the center point of the touch region, two touch electrodes are proximal to the periphery of the touch region, and the other touch electrode is surrounded by other three touch electrodes.

9. The touch panel according to claim 1, wherein in the plurality of touch electrodes, an area of the touch electrode with a largest area is 1~1.2 times an area of the touch electrode with a smallest area.

10. The touch panel according to claim 1, wherein the plurality of touch electrodes have a same area.

11. The touch panel according to claim 1, wherein at least one side edge of the touch electrode is a non-linear line.

12. The touch panel according to claim 11, wherein the side edges, proximal to each other, of adjacent touch electrodes are non-linear lines.

13. The touch panel according to claim 12, wherein a width of a gap between adjacent touch electrodes is constant.

14. The touch panel according to claim 11, wherein the non-linear line comprises one of a wavy line, an arc line and a broken line.

15. The touch panel according to claim 1, wherein the touch electrode layer further comprises a plurality of touch leads connected to the plurality of touch electrodes in one-to-one correspondence.

16. The touch panel according to claim 15, wherein at least part of the plurality of touch leads extend out of the touch region along a gap between adjacent touch electrodes.

17. The touch panel according to claim 1, wherein the back plate is a display panel.

18. An electronic device, comprising a touch panel, wherein the touch panel comprises a back plate, a touch electrode layer disposed on a side of the back plate, a touch insulating layer, and a touch wiring layer, wherein the touch electrode layer has a circular touch region, and comprises a plurality of touch electrodes and a plurality of auxiliary touch leads distributed in a peripheral wiring region, wherein the plurality of touch electrodes are distributed in the touch region, and any touch electrode distal from a periphery of the touch region has three side edges sequentially connected end to end; and the touch wiring layer and the touch electrode layer are disposed on two opposite sides of the touch insulating layer, the touch insulating layer is provided with a plurality of via holes, and the touch wiring layer comprises a plurality of touch leads, wherein the plurality of touch leads are connected to the plurality of touch electrodes through the via holes in one-to-one correspondence, and comprise a plurality of auxiliary leads, wherein the plurality of auxiliary leads are not connected to the touch electrodes, and configured to load a power voltage; and the plurality of auxiliary touch leads are in one-to-one correspondence with the plurality of touch leads, the auxiliary touch leads and the corresponding touch leads are overlapped in the peripheral wiring region and connected in parallel through the via holes; a metal layer is provided in the back plate, the touch panel is provided with a bending region, wherein the metal layer in the bending region is provided with jumper leads, the touch lead comprises two segments disposed on both sides of the bending region, and the two segments are connected to each other through the jumper lead.

19. The touch panel according to claim 9, wherein positions of a vertex angle and side edges of each touch electrode is finely adjusted, or a new vertex angle is added to adjust a local shape of the touch electrode, so as to increase or decrease the area of the touch electrode.

* * * * *